United States Patent [19]

Belofsky

[11] 4,275,937
[45] Jun. 30, 1981

[54] HOSE WITH BRAIDED REINFORCEMENT
[75] Inventor: Harold Belofsky, Ravenna, Ohio
[73] Assignee: Parker-Hannifin Corporation, Cleveland, Ohio
[21] Appl. No.: 76,900
[22] Filed: Sep. 19, 1979
[51] Int. Cl.³ ............................................. F16L 11/08
[52] U.S. Cl. ..................................... 308/127; 308/174
[58] Field of Search ............... 138/127, 126, 125, 124, 138/123, 174; 245/2

[56] References Cited
U.S. PATENT DOCUMENTS

| 1,270,053 | 6/1918 | Ream | 245/2 |
| 2,535,460 | 12/1950 | Rotter et al. | |
| 3,463,197 | 8/1969 | Slade . | |
| 3,726,321 | 4/1973 | Phillips et al. | 138/123 |
| 3,905,398 | 9/1975 | Johansen et al. | 138/124 |

Primary Examiner—Lenard A. Footland
Attorney, Agent, or Firm—James A. Baker; Russell E. Baumann

[57] ABSTRACT

A hydraulic hose having a single ply of braided wire reinforcement over a rubber core tube. The single ply of reinforcement provides burst strength, impulse resistance and flexibility comparable to that of a conventional hose having two plies of braided wire reinforcement yet utilizes less wire by weight and is smaller in O.D. The single ply of reinforcement comprises braided strands, each strand including a plurality of wires of at least two different diameters symmetrically arranged and providing about 75–95% coverage of the core tube.

16 Claims, 9 Drawing Figures

HOSE WITH BRAIDED REINFORCEMENT

BACKGROUND OF THE INVENTION

Rubber hose with braided steel wire reinforcement is used extensively in hydraulic circuits because of its high burst strength. Such hose is conventionally furnished with an elastomeric core tube, one or more plies of the braided reinforcement, depending upon the diameter of the hose and the required burst strength, and an elastomeric cover. In general, it has been the practice in the industry to use a plurality of fine wire filaments to form strands and to weave the strands into a braid wherein each strand alternatively crosses over and under two other strands, the strands being woven spirally in right and left hand directions over a rubber core tube. When two or more plies of braided wire reinforcement are used, there is usually a thin rubber liner between the plies to provide stress transfer from the inner ply to the outer ply.

In conventional braided wire reinforced hose, the wire diameter is kept relatively small in order to retain acceptable flexibility of the hose, minimum hose O.D. relative to the I.D., and to facilitate gripping of the hose by couplings. Typically, a conventional hose of ½" I.D. for meeting SAE 100R2 requirements has two ply strands which consist of eight 0.012 inch wires in a braid that are woven in a manner to provide about 80% coverage of the core tube. With steel wire of 350,000 psi wire tensile strength the burst strength of such a hose is about 15,000 psi.

In the past, attempts have been made to produce hose with a single ply wire braid that would meet performance requirements of two-braid with the object of reducing costs through the use of a lesser total weight of wire and a smaller O.D. for a given I.D. to correspondingly reduce coupling size. One approach to achieve two-ply performance with a single ply is to use wires of greater diameter, as for example, using strands made up of five wires or filaments of 0.020 inch diameter in place of eight wires of 0.012 inch diameter for ½" I.D. hose. In such case, the one-ply of reinforcement with the thicker wires provides as much burst strength as two-ply reinforcement with finer wires, but the hose flexibility is reduced to an unacceptable level. Also, greater difficulty has been experienced in gripping the hose with crimp-type couplings similar to those shown in U.S. Pat. No. 2,535,460, so as to provide satisfactory impulse test results without leakage at the couplings.

In another attempt disclosed in U.S. Pat. No. 3,463,197 the wire diameter has been reduced over conventional practice, the number of wires per strand has been increased, and the strands are woven so as to crowd and overlap each other so that the wires bunch up into two or three layers and so that 100% coverage of the core tube is achieved. However, because of the crowding and bunching of the large number of fine wires in each strand it has been found difficult to apply the braid to the core tube without having wires crossing each other where they should be lying next to and parallel to each other. Inconsistent and poor impulse test results have been experienced with such hose and it is believed that this is at least in part due to such crossovers.

SUMMARY OF THE INVENTION

It has been found that a hose with a single ply of braided wire reinforcement that matches or exceeds the burst strength of conventional two-ply wire braid hose, and having a smaller O.D., acceptable flexibility and that may be coupled with crimp-type fittings so as to provide leak proof joints under a satisfactory number of impulse cycles can be achieved by making the wires in each strand of two different diameters. The wires in each strand may be arranged in various groupings. One preferred arrangement is to have two of the larger diameter wires side-by-side each side of the strand and to have the eight smaller diameter wires in a double row between the two sets of larger wires. The fine wires may be from about one third to two thirds the diameter of the large wires.

DETAILED DESCRIPTION OF THE DRAWINGS

Figure 1:
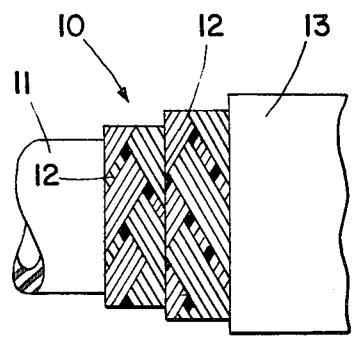
FIG. 1 is a cut-away view of a conventional hydraulic hose with two-ply braided wire reinforcement.

As shown in FIG. 1, one form of conventional prior art hydraulic hose 10 comprises an elastomeric a core tube 11 which may be of synthetic rubber, flexible plastic, or other rubber-like material, two plies of braided reinforcement 12 and a cover 13 of elastomeric material such as synthetic rubber, flexible plastic, or the like. The braid is woven from strands, usually of steel wire, although in some cases strands of plastic filaments may be used.

Figure 2:
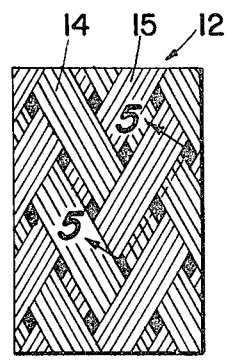
FIG. 2 is a view showing the braid pattern for conventional prior art hydraulic hose.
Figure 5:
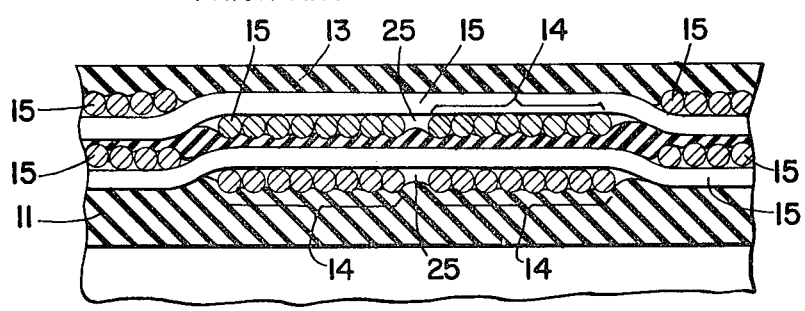
FIG. 5 is a cross-section of prior art hose along the line 5—5 of FIG. 2.

As shown in FIGS. 2 and 5, the steel wire reinforcement 12 for the prior art hydraulic hose of FIG. 1 comprises strands 14 that are composed of a plurality of wires 15 braided in a manner so that one set of strands proceeds in a right-hand spiral on the core tube and another set of strands proceeds in a left-hand spiral. Each strand alternately crosses over and then under two sets of oppositely directed strands to form the braid. For a hose of ½" I.D., the strands 14 of FIGS. 2 and 5 may typically comprise eight 0.012 inch diameter wires and woven in a manner to leave a space 25 between strands 14 so that about 80% of the core tube will be covered. To meet the pressure requirements of ½" I.D. SAE 100R2 hose it is necessary to provide two plies of the braided wire reinforcement with the strands just described. Such ½" I.D. hose will normally have a burst pressure of at least 15,000 and perform satisfactorily under impulse testing. FIG. 5 illustrates further how the strands of FIG. 2 cross-over and under each other and how the wires are oriented.

Figure 3:
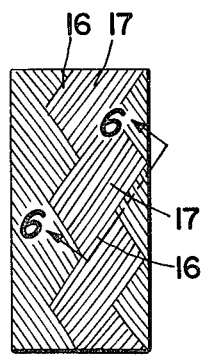
FIG. 3 is a view of the braid of U.S. Pat. No. 3,463,197.
Figure 4:
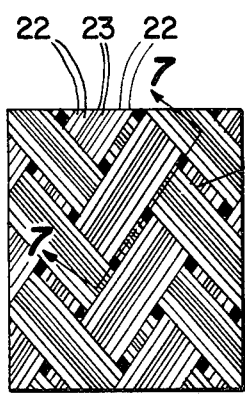
FIG. 4 is a view of the braid in one form of the present invention.
Figure 6:
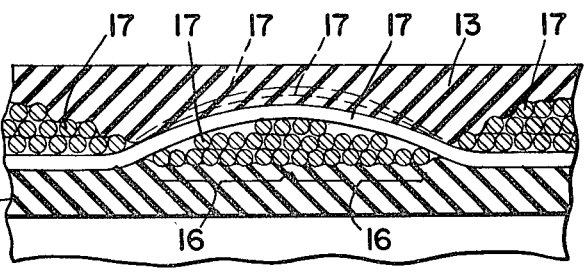
FIG. 6 is a cross-section of prior art hose along the line 6—6 of FIG. 3.

The prior art form of FIGS. 3 and 6 was developed to provide a hydraulic hose in which a single ply of wire braid provides the burst strength of a two-layer wire braid hose made in accordance with FIGS. 2 and 5. As shown in FIGS. 3 and 6, each of the strands 16 for a ½" I.D. hose contains sixteen wires 17 having a diameter of 0.009 inches. The strands are tightly woven with the wires of one strand 16 contacting and overlapping wires of an adjacent strand 16 so as to eliminate any space as at 25 in FIG. 5 between strands whereby 100% coverage of the core tube is attained. Actually enough wire is provided to provide a theoretical 130% coverage of the core tube. This results in cross-over of wires with each other and bunch up into three layers, as shown in FIG. 6. Such braiding is difficult to accomplish in a uniform manner and without excessive cross-over and bunch up.

This construction with a single layer of the reinforcement achieves the burst strength of comparable hoses of the FIGS. 2 and 5 construction that have two layers of reinforcement and have the required flexibility. They also provide a relatively smaller O.D. so that smaller and hence cheaper couplings may be used. However, such hoses appear to perform inconsistently under impulse testing with coupling blow-off type failures occurring as low as 2,000 cycles and as high as 90,000 cycles where the target is 100,000 cycles at 5,320 psi to meet SAE 100R2-8 specifications. It is believed that such inconsistent impulse test results are due, at least in part, to the wire cross-overs and bunching referred to above.

To achieve a hydraulic hose with a single layer of braided wire reinforcement that will meet the performance requirements of the double layer conventional construction of FIG. 2 and provide the advantages of the construction of FIG. 3 without the disadvantages of the latter, the present invention, as illustrated in FIGS. 4 and 7 through 9, has been developed. The invention includes the mixing of wires of two or more diameters to form strands which are then braided in a manner similar to conventional practice in which overcrowding and random bunching of the wires on the core tube is avoided. In one of the preferred forms of the invention shown in FIGS. 4 and 7, the strands 21 are each composed of four wires 22 each having a diameter of 0.015 inches and eight wires 23 each having a diameter of 0.010 inches. As shown in these figures, two of the thicker wires 22 are on each side of strand 21 and the thinner wires 23 are grouped in a double row between the two sets of thicker wires. The strands 21 are woven in the conventional "two over—two under" manner shown in FIG. 4, (the same as the weave in FIGS. 2 and 3), and preferably at a mean braid angle of 53.5 degrees.

The width of the strands 21 with the wires as indicated is 0.094 inches and the strands are woven so that there is a separation of about 0.005 inches at 25 between adjacent strands. This separation results in about 88% coverage of the core tube, which permits ready application of the braid to the core tube without crowding or bunching and with some freedom of movement of the wires during flexing and/or application of fluid pressure to the hose and results in good stress transfer from wire-to-wire. Impulse test results have ranged from "leaks at the coupling" type failures at 84,000 cycles to 120,000 cycles without failure at 5,320 psi for the ½" I.D. size. Flexibility is comparable to the two-ply conventional hose but the O.D. of the wire braid reinforcement is reduced from 0.790 inches for the conventional construction to 0.725 inches for the construction of FIGS. 4 and 7, therefore making it possible to use couplings of smaller diameter.

Figure 8:
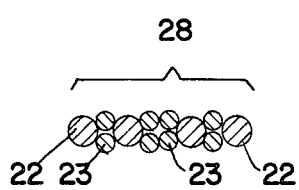
FIGS. 8 and 9 show cross-sections of two alternate arrangements of wire filaments to form strands in accordance with the present invention.
Figure 7:
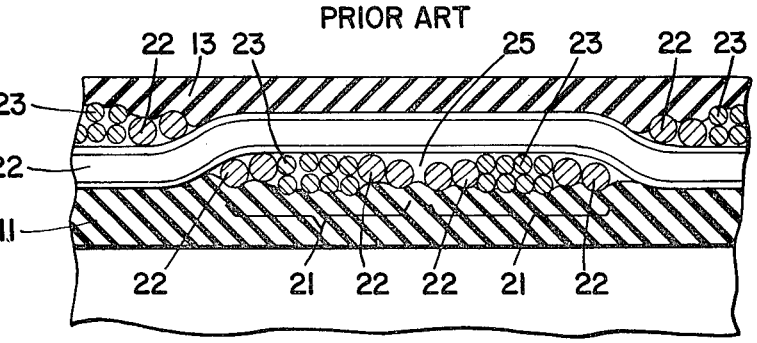
FIG. 7 is a cross-section of a hose having braid in accordance with the present invention and along the line 7—7 of FIG. 4.

In the optional construction of FIG. 8, the strand 28 is composed of four 0.015 inch diameter wires 22 and eight 0.010 inch diameter wires 23 as in FIG. 7 but they are arranged differently with one large diameter wire on each side followed by two smaller wires, one over the other, then another large diameter wire and finally four smaller diameter wires in the center of the strand.

Figure 9:
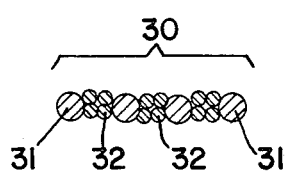

In the form of the strand 30 shown in FIG. 9, there are four wires 31 of 0.015 inch diameter alternating with three sets of four 0.008 inch wires 32. Hoses braided in the manner of FIG. 4 with the strands of FIGS. 8 and 9 give approximately the same results as hoses with strands arranged as in FIG. 7.

When two plies of wire braid are used, the high strength wire that is employed has little yield or extensibility. Consequently, the inner layer does not expand readily under fluid pressure within the hose so that the load transferred from the first braid layer to the second braid layer is considerably les than one half the total load. This makes it necessary that the total quantity of wire used in the hose to be substantially greater than if the load were uniformly distributed between the two layers. In the construction of the present invention, the one layer bears the entire load and thus there is no loss due to inefficient stress transfer. As a result, the total amount or weight of wire is significantly less, which contributes to reduce costs. Thus, the wire content in the conventional two-layer wire braid hose of ½" I.D. is 253 lbs. per thousand feet while in a comparable hose of one-layer construction in accordance with the present invention the wire content is 182 lbs. per one thousand feet, which results in a considerable saving in cost.

I claim:

1. A tubular braided hose reinforcement comprising means including a plurality of braided strands, each strand comprising a group of filaments of different diameters, said strands being spirally wound about a predetermined diameter, one of said strands being wound in a right-hand direction and another being wound in a left-hand direction and alternately crossing above and below each other, said means providing improved burst strength.

2. A hose comprising a core tube of resilient material, and means comprising a tubular braided reinforcement over the core tube, said reinforcement comprising a plurality of braided strands, at least two strands each comprising a plurality of filaments of different diameters, said strands being spirally wound about the core tube, one of the strands being wound in a right-hand direction and the other in a left-hand direction and alternately crossing above and below each other said means providing improved burst strength.

3. The hose of claim 2 in which said strands are identical in the number of filaments of each diameter and in the positioning of the filaments of different diameters relative to each other.

4. The hose of claim 2 in which the larger size filaments are substantially twice the diameter of the smaller size filaments.

5. The hose of claim 2 in which said larger diameter filaments are separated by at least two of the smaller diameter filaments.

6. The hose of claim 2 in which said strand is a generally flat and ribbonlike layer and a larger diameter filament is at each side extremity of the layer.

7. The hose of claim 2 in which said strand comprises an even number of large diameter filaments and an even number of smaller diameter filaments.

8. The hose of claim 2 in which said filaments comprise symmetric spacing of said larger and smaller diameter filaments about the longitudinal centerline of the strand.

9. The hose of claim 2 in which said strand comprises twice as many smaller diameter filaments as larger diameter filaments.

10. The hose of claim 2 in which no more than two of the larger diameter strands are adjacent each other.

11. The hose of claim 2 in which the filaments are steel wire.

12. The hose of claim 11 in which the wires have a tensile strength of at least 350,000 psi.

13. The hose of claim 2 in which the smaller diameter filaments are from about one third to two thirds the diameter of the larger diameter filaments.

14. The hose of claim 2 in which the smaller diameter filaments are about two thirds the diameter of the larger size filaments and are twice in number.

15. The hose of claim 2 in which said strand comprises a set of two larger size filaments on each side of the strand and a plurality of the smaller size filaments between said sets.

16. The hose of claim 15 in which the smaller size filaments are arranged in two rows, one over the other.

* * * * *